2 Sheets—Sheet 1.

C. W. BALDWIN.

HYDRAULIC ELEVATOR.

No. 7,032. Reissued April 4, 1876

Witnesses.

L. H. Latimer.

W. J. Pratt.

Inventor.

Cyrus W. Baldwin per Crosby & Gregory

Attys.

N. PETERS, PHOTO-LITHOGRAPHER, WASHINGTON, D. C.

2 Sheets—Sheet 2.

C. W. BALDWIN.

HYDRAULIC ELEVATOR.

No. 7,032. Reissued April 4, 1876.

Witnesses.

L. H. Latimer.

W. J. Pratt.

Inventor.

Lyman H. Baldwin per Crosby & Gregory Att'ys.

N. PETERS, PHOTO-LITHOGRAPHER, WASHINGTON, D. C.

UNITED STATES PATENT OFFICE

CYRUS W. BALDWIN, OF BOSTON, MASSACHUSETTS, ASSIGNOR, BY MESNE ASSIGNMENTS, TO THE WHITTIER MACHINE COMPANY.

IMPROVEMENT IN HYDRAULIC ELEVATORS.

Specification forming part of Letters Patent No. 127,139, dated May 28, 1872; reissue No. 7,032, dated April 4, 1876; application filed September 11, 1875.

*To all whom it may concern:*

Be it known that CYRUS W. BALDWIN, of Boston, in the county of Suffolk and Commonwealth of Massachusetts, has made an invention of certain novel and useful Improvements in Hydraulic Elevators; and does hereby declare the nature, purposes, and advantages of the said invention, and the manner in which the same are or may be carried out to be ascertained in and by the following specification, taken in connection with the accompanying drawing illustrative thereof, and in which—

Figure 3:
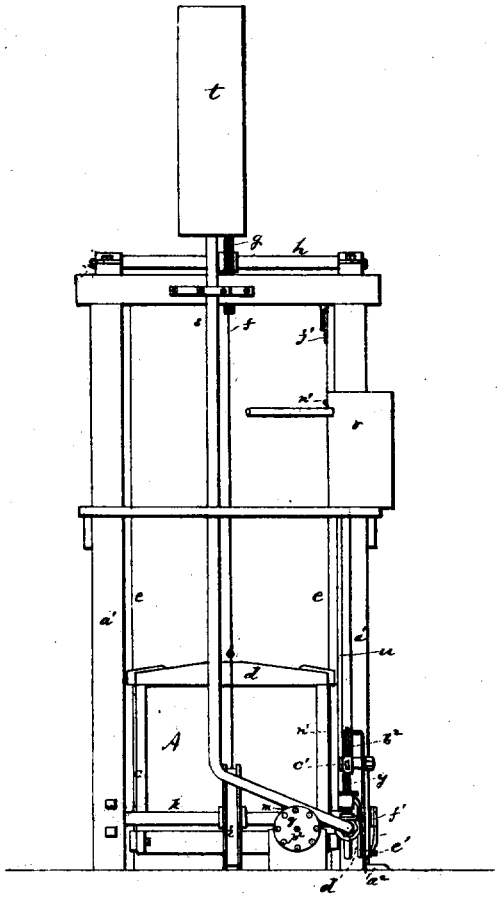
Figure 1:
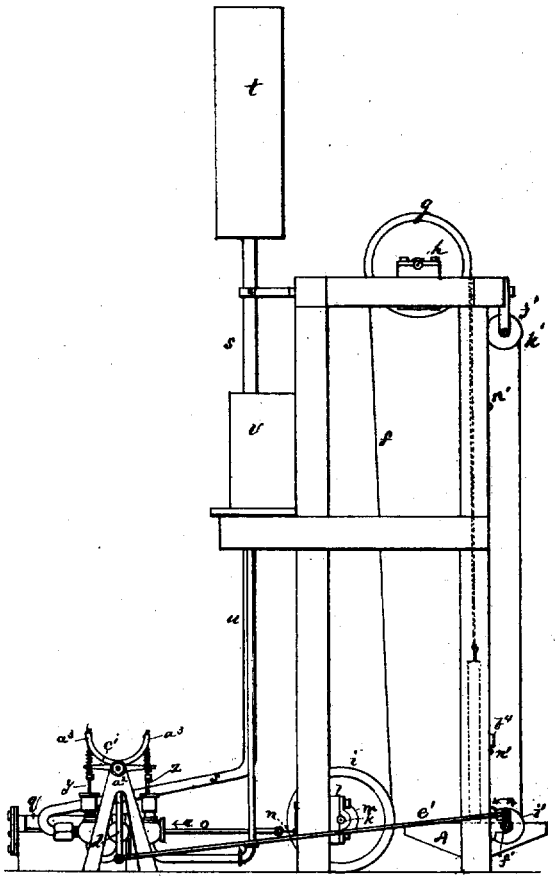
Figure 4:
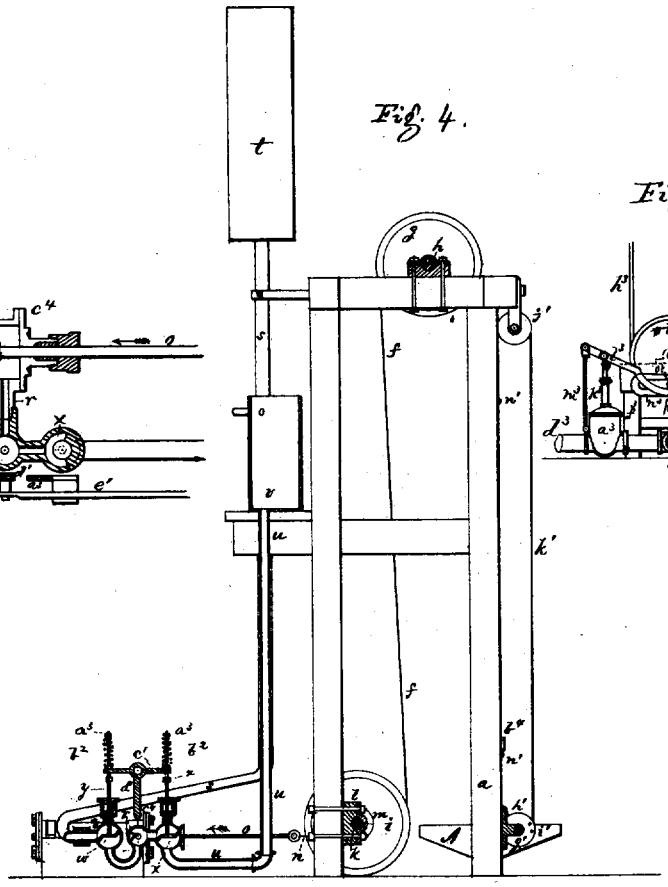
Figure 5:
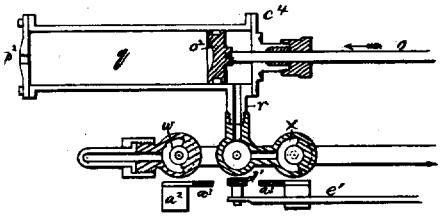
Figure 2:
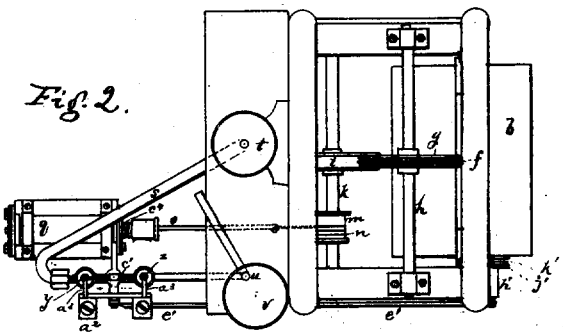

Figure 1 is a side elevation, Fig. 2 a plan, Fig. 3 an end elevation, and Fig. 4 a vertical section, of an elevator embodying these improvements. Fig. 5 is a horizontal section of the cylinder and valves, to be explained hereafter.

These improvements relate to hydraulic elevators, so called, in which water is the agent employed for elevating the carriage and its load. The water escaping from the elevating mechanism is raised to a certain elevation, less than that of the main head or supply, where it is retained to be utilized for various household or mechanical necessities or conveniences.

In carrying out this invention, there are employed one or more cylinders, open at rear, and containing each a piston and port; and connected with the said cylinder-port, which is alternately an inlet and discharge port, is the discharging-pipe of the head or main supply of water by which the elevator is operated, and also the receiving-pipe of the surplus or waste-water tank, which, as before premised, is situated at some point below the main head or supply-tank, and at a greater or less elevation above the basement of the building where the actuating cylinder or mechanism is located, whether this elevation be first, second, or third stories above such basement, this height to which the waste-water is raised being governed by the weight borne by the descending elevator-carriage; and combined with or located in the inlet and discharge pipes of each cylinder is a valve, opening upward, these valves being so arranged and controlled by suitable instrumentalities, hereinafter explained, that the attendant, by means thereof, is enabled, when he desires the carriage to ascend, to open one valve, or the ingress-valve, and permit water from the main head to enter the cylinder through this valve, and drive the piston in such a direction as to elevate (by details of mechanism hereinafter explained) the said carriage, the valve of the opposite or discharge-pipe, which leads to the surplus or receiving tank, being at the time automatically closed, while, if the carriage is to descend, the operator, by a reversed action of the same agency, closes the ingress-valve of the main supply-pipe, and opens that of the receiving or surplus tank-pipe, and permits the weight of the descending carriage, or the same and its load, to force or pull the piston outwardly or in a direction opposite to that effected by the inrushing water, this latter traverse of the piston driving the water contained in the cylinder before it through the egress-port and pipe outward into the receiving tank or discharge, the whole being and operating as hereinafter stated, the two valves in their mean or intermediate position, when the carriage is motionless, being both closed, in which case no power is exerted upon the carriage, and the piston is met by a solid cushion or abutment of water, which estops its movement until a valve is opened and the water in the cylinder begins a movement.

The piston-rod has connected with its outer end a rope or chain, which leads to a small drum on a cross-shaft, and on the same shaft is the larger drum for operating the hoisting-rope or suspensory or chain, the small drum receiving and the large drum imparting power, and the rope or chain is connected to the piston-rod, so as not to depress the piston-rod below the surface of the drum. The connector *n*, the piston-rod, and one face of the small drum are in the same plane.

The accompanying drawing represents at *a* *a*$^1$ *a*$^1$ four upright posts, which, properly stayed, constitute the boundary in which the elevator-carriage (shown at A) travels. This carriage A is of ordinary construction, and is composed of a horizontal platform, *b*, two side hangers or supporters, *c c*, and a cross-head, *d*, the perpendicular ways or slides which guide the movements of the carriage being shown at *e e*, as applied to opposite posts *a a*. The suspensory of the carriage A is a rope, *f*, one end of which is affixed to the center of the cross-head *d*, while it is carried upward about a pulley, *g*, mounted upon a horizontal shaft, *h*, spanning the carriage-way, and situated at the extreme upper part of the building, the suspensory *f* passing about this, thence descending to the lower floor or basement of the said building, where its opposite end is securely attached to the periphery of the hoisting-drum *i*, which is mounted upon a second horizontal shaft, *k*, revolving in suitable boxes *l l*, upborne by the posts $a^1$ $a^1$, or otherwise properly disposed. Upon the shaft *k* is mounted a second and smaller drum, *m*, to the periphery of which is secured one end of a connector, a rope, or chain, *n*, the opposite end of such rope being secured to the outer end of a piston-rod, *o*, which belongs to a piston situated within a horizontal cylinder, *q*, such cylinder being situated preferably upon a level with the shaft *k*.

At one end of the cylinder *q* is formed a port or passage, *r*, which becomes alternately the ingress and discharge port, the water entering this port, and consequently the cylinder, through a pipe, *s*, which leads from the main supply-tank or head, which is shown at *t*, in the present instance, while the water, after entering the cylinder, is, upon a reversal of the piston, expelled through the same port and through an outlet-pipe, *u*, which leads to the surplus or waste-water tank *v* before alluded to, the two pipes *s* and *u* being each furnished with a valve, *w* or *x*, opening upward, as shown in Fig. 4 of the accompanying drawing, and situated by preference immediately adjacent to the passage *r*. The stems *y z* of the valves *w x* rise upward through and slide within the arms $a^3$ $a^3$ of a forked standard, $a^2$, and are provided with suitable springs, $b^2$, to depress them upon their seats, while each is swiveled with power of vertical play at about its center to one end of a horizontal oscillating lever or working-beam, $c^1$, pivoted to the standard $a^2$, the arrangement of the two valves and their actuaries being such that while the descending carriage is forcing the piston in one direction, and thereby driving the water between it and the piston-head $c^4$ outward through the valve *x*, passage *r*, and surplus-tank pipe *u*, the valve *w* of the main tank is closed, which prevents the water in its efforts to find its own level from flowing from the greater altitude of the main tank to the lesser heights of the surplus or waste-water tank, and vice versa, as the piston is moving in a reverse direction, by the force of the inrushing water from the main tank through the pipe *s* and inlet-valve *w*, and thus elevating the carriage, the outlet-valve *x* is closed, and the flow of water thereat to the surplus-tank pipe thereby cut off. A rod or bar, $d^1$, depends from the center of the lever $c^1$, and to the lower extremity of this bar one end of a long pitman, $e^1$, is pivoted, the opposite end of such pitman in turn being pivoted to the wrist-pin of a crank or crank-wheel, $f^1$, mounted upon a short horizontal rock-shaft, $g^1$, which rocks in bearing $h^1$, applied to one of the outer posts *a a*, the inner extremity of this rock-shaft carrying a small drum or pulley, $i'$, about which and a second and similar-sized drum, $j'$, an endless hand rope or cord, $k^1$, passes, as shown in Fig. 4 of the drawing hereto annexed, the inner half or side of such cord passing through the platform *b* or an ear, $b^4$, applied to one side support, *c*, in order to be readily seized by the operator.

While the carriage A is stationary the crank $f^1$ is upright or midway between its extremes of movement, and the lever $c^1$ is horizontal, the two valves *w* and *x* being both tightly closed, by which means, as before stated, no motion of water within the cylinder is permitted, and the piston is estopped by the said water.

The arrangement of parts is such that while under this condition the crank is describing a movement through ninety degrees of a circle, one end of the lever $c^1$ is being elevated and the valve connected to it opened, the opposite end of such lever descends through the slotted head of the valve-stem next it without actuating this latter valve.

The above mechanical construction of parts constitutes one method by which is carried out the object of this invention, and its operation is as follows: Taking as a starting-point the position of the carriage A, shown in the drawing—that is, as nearly or quite at the lower part of the carriage-way—and with the inlet-valve *w* and the outlet-valve *x* both closed, the piston of the cylinder *g* being at the entrance-end thereof and uncovering the port *r*, the next movement of the carriage A must of necessity be an ascent; and to accomplish this the attendant seizes and depresses the inner portion of the hand-rope $k^1$, which effects a rocking of the shaft $g^1$ and its crank in the direction of its arrow to the extent of ninety degrees, or thereabout, such movement of the crank by the agency of the pitman $e^1$ and arm $d^1$ tilting the lever $c^1$ into a sloping position, and opening the valve-inlet *w* and leaving the outlet-valve *x* closed. Water now rushes from the main tank *t* through the pipe *s* and open valve *w* into the cylinder *q*, and drives its piston in the direction of the arrow placed over its rod *o*, this movement of the piston and rod through the aid of the rope *n*, drum *m*, and suspensory *f* effecting the ascent of the carriage A, which continues to rise until the desired elevation is reached, when the attendant seizes the cord $k^1$ and pulls upon it with sufficient force to tilt the lever $c^1$ into a horizontal position, and thus by closing both valves, as before stated, arrests the flow of water to the cylinder, and, as a consequence, stops the movement of its piston and the ascent of the carriage.

If the carriage is again to ascend, the attendant depresses the cord $k^1$, as at first; but if the carriage is to descend, he lifts the cord until the crank $f^1$ is thrown in an opposite direction to the extent of ninety degrees of a circle, or thereabout, which opens the outlet-valve $x$ and closes the inlet-valve $w$, thus opening circulation between the cylinder and outlet-pipe $u$, and permits the weight of the carriage as it descends to drive the piston in a direction opposite to that which the inrushing water effected, this return movement of the piston driving the water contained in the cylinder between it and the cylinder-head through the outlet-port $x$, and upward through the pipe $u$ into the tank $v$, the descent of the carriage continuing until it reaches the bottom of the structure, or until the attendant, by depressing the hand-rope until the lever $c^1$ is horizontal, closes the two valves, when the carriage remains stationary.

To guard against accident from the inattention or negligence of the attendant, as the carriage reaches the extreme top or bottom of the building, there are affixed to the hand-rope $k$ two buttons or knobs, $n^1$ $n^1$, these knobs being so situated that, as the carriage arrives at its extreme highest or lowest position, it strikes the adjacent knob, and so actuates the rope and the mechanism connected with it as to close the two valves and stop the motion of such carriage.

From the above it will be seen that there can be elevated to the tank $v$ a portion or the whole of the water contained in the cylinder between its head and the piston, which was admitted thereto to effect the last preceding elevation of the carriage, and the height to which this water may be raised is limited only by the comparative weight of the carriage, or the latter and its load, since, so long as the latter exceeds the former, the water will be elevated to a greater or less distance.

The system of operating an elevator-carriage, as hereinbefore explained, is not confined to conditions of head or pressure of water, as a tank of water may be utilized for the purpose by employing a steam-pump to obtain the necessary pressure, whereby the piston is actuated within the cylinder and the carriage elevated, the discharge-water simply returning to the tank to be again pumped into the cylinder. In this manner a tank of water may be used in localities having no pressure of water until the water in such tank becomes dirty or offensive, when it is thrown away, and a new supply obtained. The practical cost in this instance of operating an elevator will be that attending the running of a small steam-pump, by means of which pump or its equivalent an elevator of this class may be employed in localities having, as before stated, no head or pressure sufficient to actuate it.

Figure 6:
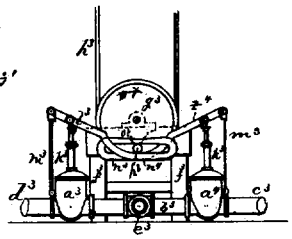

In lieu of the herein-described arrangement of the tilting-lever $c^1$, and its connection with the valves $w$ and $x$, as a means of operating the latter, a device may be employed, the nature of which is shown in Fig. 6 of the drawing, which is a side elevation of the valve-chambers, eduction and induction pipes, and cylinder-supply pipe. In this $a^3$ $a^4$ represent the two valve-chambers or boxes, as applied to, or making part of, a horizontal conduit or pipe, $b^3$, one end of which, or that marked $c^3$, is the eduction or escape pipe, and $d^3$ the induction or inlet pipe, $e^3$ being the passage leading to the cylinder. $f^3$ represents a vertical frame of a nature suitable to support a vertical wheel or pulley, $g^3$, situated alongside of the conduit and valve-boxes before named, this wheel $g^3$ corresponding to the wheel hereinbefore named, and having the hand-rope, shown at $h^3$, passing about its circumference, and extending to and about a second wheel situated in manner similar to the wheel $j^1$ hereinbefore named.

The valve-stem $k^3$ of each valve rises upward, and is pivoted at its upper end to a horizontal, or nearly horizontal, lever, $l^3$, the outer end of each lever $l^3$ being in turn pivoted to an upright post or rod, $m^3$, the lower end of which is fixed or pivoted to the valve-box, while the inner end of each lever $l^3$ is fashioned into a yoke or hook, $n^3$ or $n^4$, represented in Fig. 6 of the drawing. The two hooks are disposed side by side, and when in a normal position—that is to say, when both valves are closed—are in the same horizontal plane, and are of such length that their extremities meet and pass by each other a short distance, as shown at $o^3$. $p^3$ in the said Fig. 6 represents a horizontal pin or stud, which projects from the face of the wheel $g^3$, and near its circumference, the normal or intermediate position of this pin, when the valves are closed, being directly beneath the lap of the two hooks $n^3$ or $n^4$.

When it becomes desirable to open the eduction-valve $a^4$, and permit the induction-valve to remain closed, the attendant pulls upon the hand-rope in such manner as to partially rotate the wheel $g^3$ in the direction of its arrow, the effect of which is to compel the stud $p^3$ to leave the hook $n^4$ at rest, and impinge against and elevate the hook $n^3$ and its lever, while, vice versa, to open the induction-valve $a^3$, while the eduction-valve remains closed, the attendant, by means of the hand-rope $h^3$, partially rotates the wheel in the opposite direction, and compels the stud or wrist-pin $p^3$ to leave the hook $n^3$ and impinge against and elevate the hook $a^4$ and its lever.

The principal object had in view in organizing these valve-operating devices has been to open the induction-valve with a slow and gradually-accelerating movement, and close the eduction-valve with a reverse or gradually-diminishing rate of movement, in order that the thrusts and noise, otherwise resulting from the sudden escape or passage of water through one or the other of such valves, may be avoided.

It will be seen that this object is accomplished, as the preliminary movement described by the stud $p^3$ is in a path nearly parallel to the longest plane of the adjacent hook, and, therefore, raises the latter and its valve very slowly, and it gradually increases in rapidity of movement until such stud has described about ninety degrees of a circle, when the valve is full open.

I claim—

1. In combination with an elevator-carriage and main-supply and surplus-receiving tanks, one or more cylinders and pistons connected with said tanks and carriage, substantially in the manner described, and provided with valves for regulating ingress and egress of water, and mechanism whereby said valves may be operated from or by the carriage at any height, substantially as herein shown and set forth.

2. The combination of the cylinder *q* and its piston, and the inlet and outlet valves, with a rotary reciprocating shaft, operated by a hand-rope, and connected with, and operating to open, the inlet-valve and close the outlet-valve with a gradually accelerating and diminishing motion, substantially as described.

3. The combination, with the carriage, the cylinder, and piston, of a shaft with large and small drums, the former receiving the hoisting-rope and moving the carriage, and the latter being connected with, and operated by, the piston, the combination being and operating substantially as described.

4. The combination of the cylinder and piston with shaft *k*, its drum *m*, connector *n*, the latter connected with the piston and with the drum, the piston-rod, connector, and drum-face being in the same plane, substantially as described.

CYRUS W. BALDWIN.

Witnesses:
LOUIS SPRINGERS,
HENRY P. WELLS.